No. 868,875. PATENTED OCT. 22, 1907.
J. W. LATCHER.
CAR WHEEL AND THE METHOD OF ATTACHING SAME TO AXLES.
APPLICATION FILED MAR. 12, 1907.
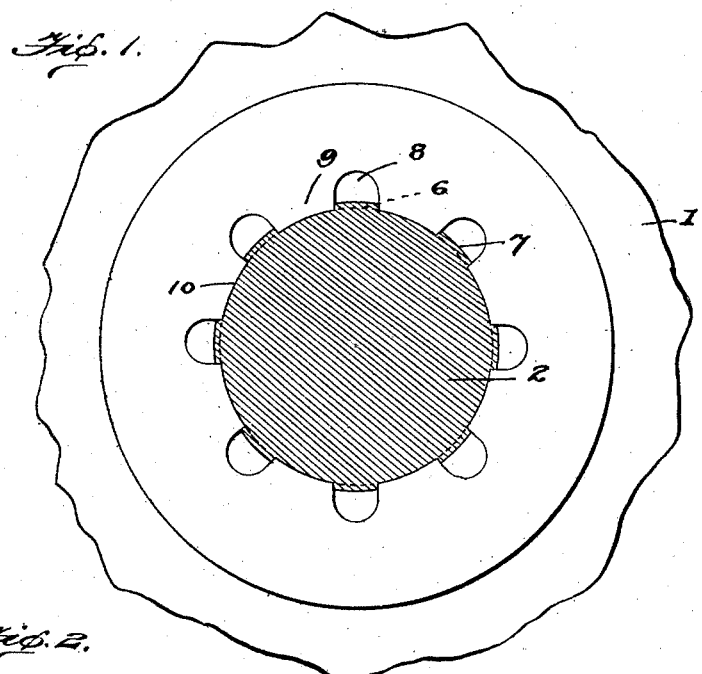
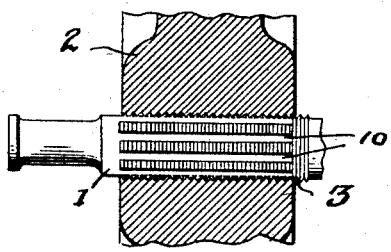
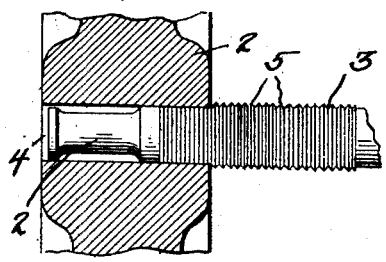
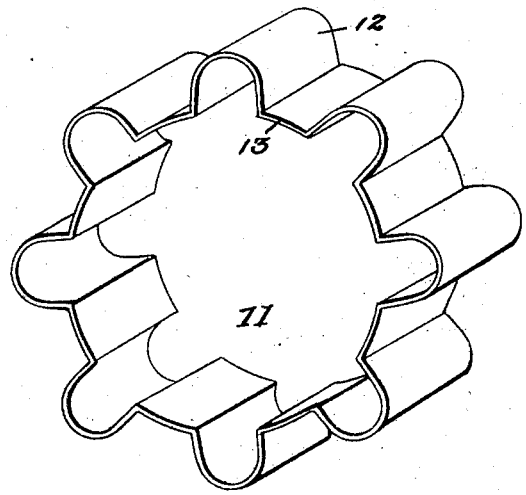
Witnesses.
Inventor,
John Walthart Latcher
by David P. Moore.
Attorney.

UNITED STATES PATENT OFFICE.

JOHN WALTHART LATCHER, OF EDINBURG, NEW YORK.

CAR-WHEEL AND THE METHOD OF ATTACHING SAME TO AXLES.

No. 868,875.

Specification of Letters Patent.

Patented Oct. 22, 1907.

Application filed March 12, 1907. Serial No. 362,038.

*To all whom it may concern:*

Be it known that I, JOHN WALTHART LATCHER, a citizen of the United States, residing at Edinburg, in the county of Saratoga and State of New York, have invented certain new and useful Improvements in Car-Wheels and the Method of Attaching Same to Axles, of which the following is a specification, reference being had therein to the accompanying drawing.

My present invention relates to improvements in car wheels, and the method of attaching same to axles, the main object of the invention, being an improved construction of connection between the two, whereby the wheel and axle is easily attached, and in such a manner, as to withstand the severe torsional strain occasioned in rounding curves, or the uneven application of the brakes upon the wheels. To this end, I provide the wheels with corrugations, ridges or flutes, which when forced upon the axle cuts its way through the roughened wheel-receiving portion of the axle and thus provides longitudinal peripheral grooves therein, which assist in holding the wheel and axle in their relative assembled position.

The method or process, which is my invention, resides in the providing the longitudinal flutes or ridges in the center of the wheel body, and forcing the wheel upon the axle, so that the said flutes or ridges plow or cut their way along the roughened portion (or wheel-attaching portion) of the axle, this feature being of great importance, as will presently appear.

To more clearly illustrate my invention, attention is invited to the accompanying drawings, in which:—

Figure 1 is an end view of the central portion of a car wheel, the axle being in section. Fig. 2 is a cross section through wheel and axle. Fig. 3 illustrates the first step of the process of attaching the wheel to the axle, of which Fig. 2 illustrates the final positioning of the two. Fig. 4 is a perspective view of a corrugated or fluted band, that may be used with and forms a part of my invention.

Referring to the drawings:—The numeral 1 designates the body of the car wheel and 2 the axle. The portion 3, of the axle, which is to be driven into the wheel body, is turned slightly larger in diameter than the bored opening 4, of the wheel, and is roughened by turning V-shaped spiral grooves 5, thereon in the usual manner, the base of the grooves, being represented by the dotted arcs 6. The unbroken arcs 7, show the outer limit or periphery of the threaded or roughened surface 3 of the axle.

The grooves or channels 8, alternate with the flutes or ridges 9, of the wheel, and when the wheel body is started, as illustrated in Fig. 3, the said ridges or flutes 9, plow their way through the surface 3, of the axle, and when finally seated or positioned, as illustrated in Fig. 2, have formed longitudinal channels 10, in the roughened surface 3 of the axle, so that the wheel is now securely fastened to the axle.

The central opening of the car wheel, may be cast by means of compressed sand cores in fluted or corrugated form, set centrally to the tread or periphery chill of the flask, but cores without exterior protection to be used in this form would be liable to become broken or out of true position. I, therefore, incase the core material in a corrugated or fluted band 11, or I may say, chaplet, of thin metal, as roofing tin, sheet iron or the like, the construction of the same being clearly shown in Fig. 4. The bends 12 form the grooves of the wheel, and the connecting webs 13, form the ridges or flutes of the wheel. In the casting process the band or chaplet 11, makes a clean opening, free from sand, so that, in boring the opening to the proper diameter for the axle, the boring tool will not be so readily dulled, as it does under the old methods of coring now in vogue.

My process, therefore, of producing my improved car wheel and axle assembled, consists in providing the wheel-attaching portion with the roughened surface, casting the wheel with the corrugated central opening, coring the same, and then pressing the wheel upon the roughened portion of the axle, the said corrugation during the pressing action, plowing grooves longitudinally through the roughened surface of the axle, as clearly illustrated in Fig. 2.

What I claim, is:—

1. The method of assembling car wheels and axles, consisting in providing the car wheel body with longitudinal cutting edges, and pressing the wheel upon the axle whereby grooves corresponding to the cutters are formed in the axle surrounded by the wheel.

2. The method of assembling car wheels and axles, consisting in providing longitudinal corrugations in the central opening of the wheel body, and pressing the wheel body upon the axle, so that the corrugations engaging the surface of the axle, plow their seats longitudinally upon the axle.

3. The method of assembling car wheels and axles, consisting in providing longitudinal corrugations in the central opening of the wheel body, and pressing the wheel body upon the axle so that the corrugations engaging the surface of the axle plow their seats longitudinally upon the axle and provide longitudinal openings between the channels of the corrugations and the axle.

4. The combination with an axle, of a wheel having a cutting opening therein adapted to form longitudinally parallel seats in the axle during the operation of assembling the wheel and axle, for the purpose set forth.

5. The combination with a car axle having a roughened wheel-receiving surface, of a wheel adapted to provide a series of circumferentially parallel seats in said roughened surface during the assembling operation.

6. The combination with a car axle having a roughened wheel-receiving surface, of a wheel having a ridged central opening, adapted to engage said roughened surface of the axle, the ridges of the opening forming seats for the wheel in the roughened surface of the axle.

7. The combination with a car axle having a roughened wheel-receiving surface, of a wheel having a ridged central opening, adapted to engage said roughened surface of the axle, the ridges of the openings cutting corresponding seating grooves in the roughened surface of the axle during the assembling operation.

8. A car wheel provided with a plurality of integral self-seating means, as set forth.

9. A car wheel provided with a central axle-receiving opening having a plurality of integral self-seating means, as set forth.

10. A car wheel having a central axle-receiving opening having a plurality of self-seating cutting means to engage the axle.

11. A car wheel having a central axle-receiving opening provided with longitudinal cutters, for the purpose set forth.

12. A car wheel having a central axle-receiving opening provided with a plurality of longitudinal cutters.

13. A car wheel having a corrugated or fluted central opening, the ridges of which are self-seating cutters.

14. A car wheel having a corrugated or fluted central opening, the ridges of which are adapted during the assembling of the wheel and axle to cut their seats in the axle.

In testimony whereof I affix my signature in presence of two witnesses.

JOHN WALTHART LATCHER.

Witnesses:
ROSENA A. LATCHER,
HETTIE COPELAND.